United States Patent [19]

Matick et al.

[11] Patent Number: 4,663,729

[45] Date of Patent: May 5, 1987

[54] DISPLAY ARCHITECTURE HAVING VARIABLE DATA WIDTH

[75] Inventors: Richard E. Matick, Peekskill; Daniel T. Ling, Croton-on-Hudson; Frederick H. Dill, South Salem, all of N.Y.

[73] Assignee: International Business Machines Corp., Armonk, N.Y.

[21] Appl. No.: 616,047

[22] Filed: Jun. 1, 1984

[51] Int. Cl.$^4$ ............................................ G06F 13/00
[52] U.S. Cl. ..................................... 364/900; 340/798
[58] Field of Search ... 364/200 MS File, 900 MS File; 340/723, 730, 732, 747, 750, 752, 754, 768, 798, 799, 800, 801, 805

[56] References Cited

U.S. PATENT DOCUMENTS

| | | | |
|---|---|---|---|
| 3,500,466 | 3/1970 | Carleton | 364/200 |
| 3,665,409 | 5/1972 | Miller et al. | 364/200 |
| 3,949,375 | 4/1976 | Ciarlo | 364/200 |
| 4,004,283 | 1/1977 | Bennett et al. | 364/200 |
| 4,034,346 | 7/1977 | Hostein | 364/200 |
| 4,057,846 | 11/1977 | Cockerill et al. | 364/200 |
| 4,070,710 | 1/1978 | Sukonick et al. | 364/200 |
| 4,075,691 | 2/1978 | Davis et al. | 364/200 |
| 4,079,452 | 3/1978 | Larson et al. | 364/200 |
| 4,090,174 | 5/1978 | Van Voorhis | 364/900 |
| 4,115,856 | 9/1978 | Labeye-Voisin et al. | 364/200 |
| 4,126,897 | 11/1978 | Capowski et al. | 364/200 |
| 4,128,883 | 12/1978 | Duke et al. | 364/200 |
| 4,133,030 | 1/1979 | Huettner et al. | 364/200 |
| 4,159,534 | 6/1979 | Getson, Jr. et al. | 364/200 |
| 4,174,536 | 11/1979 | Misunas et al. | 364/200 |
| 4,205,373 | 5/1980 | Shah et al. | 364/200 |
| 4,435,792 | 3/1984 | Bechtolsheim | 365/230 |
| 4,442,503 | 4/1984 | Schütt et al. | 364/900 |
| 4,467,443 | 8/1984 | Shima | 364/900 |

*Primary Examiner*—Eddie P. Chan
*Assistant Examiner*—Kevin A. Kriess
*Attorney, Agent, or Firm*—C. Lamont Whitham; Roy R. Schlemmer, Jr.

[57] ABSTRACT

A display architecture is disclosed which supports a variable, selectable number of bits per chip and a variable, selectable segment width. The architecture comprises a plurality of dynamic memory chips and a function generator. Each of the memory chips includes at least two data islands wherein each data island has its own data in/out line, chip select and increment bit supplied by the function generator. The function generator receives a starting address $X_o$, $Y_o$, the data path width $N_D$ and an encoded segment width S. A bit incrementer in the function generator generates increment bits $A_I$ based on the externally supplied modulo $N_D$. The function generator generates the physical word address $w_o$ and physical bit address $b_o$ based on the starting address $X_o$, $Y_o$, the data path width $N_D$ and the encoded segment width S. Logic circuitry is provided which is responsive to an overflow bit produced by the bit incrementer to control spill and wrap functions. Spill results from the usual bit address incrementing where the data spills from the highest order chip to the lowest. Wrap is a special case when spill occurs at the right hand edge of the screen and data wraps around on the same scan line to the left hand edge of the screen.

9 Claims, 18 Drawing Figures

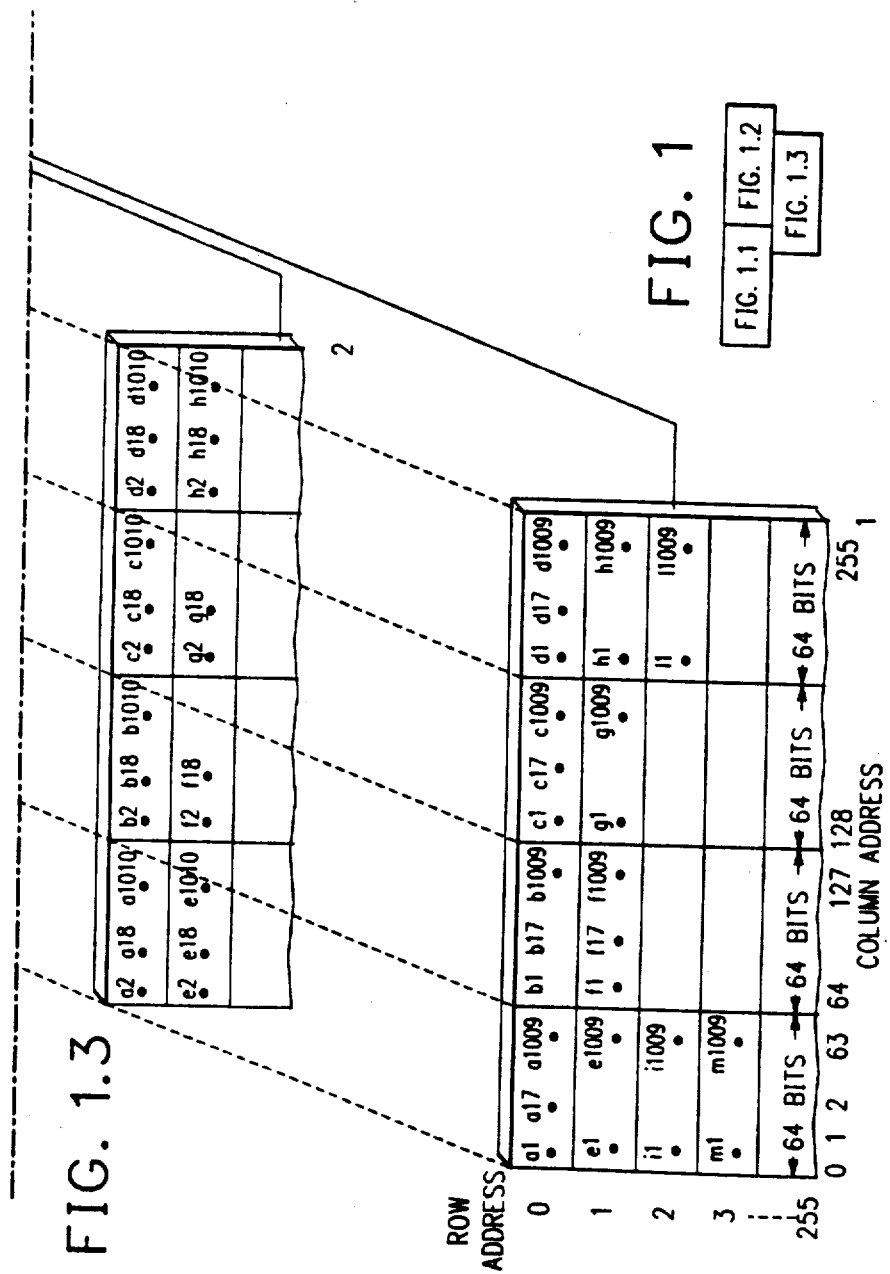

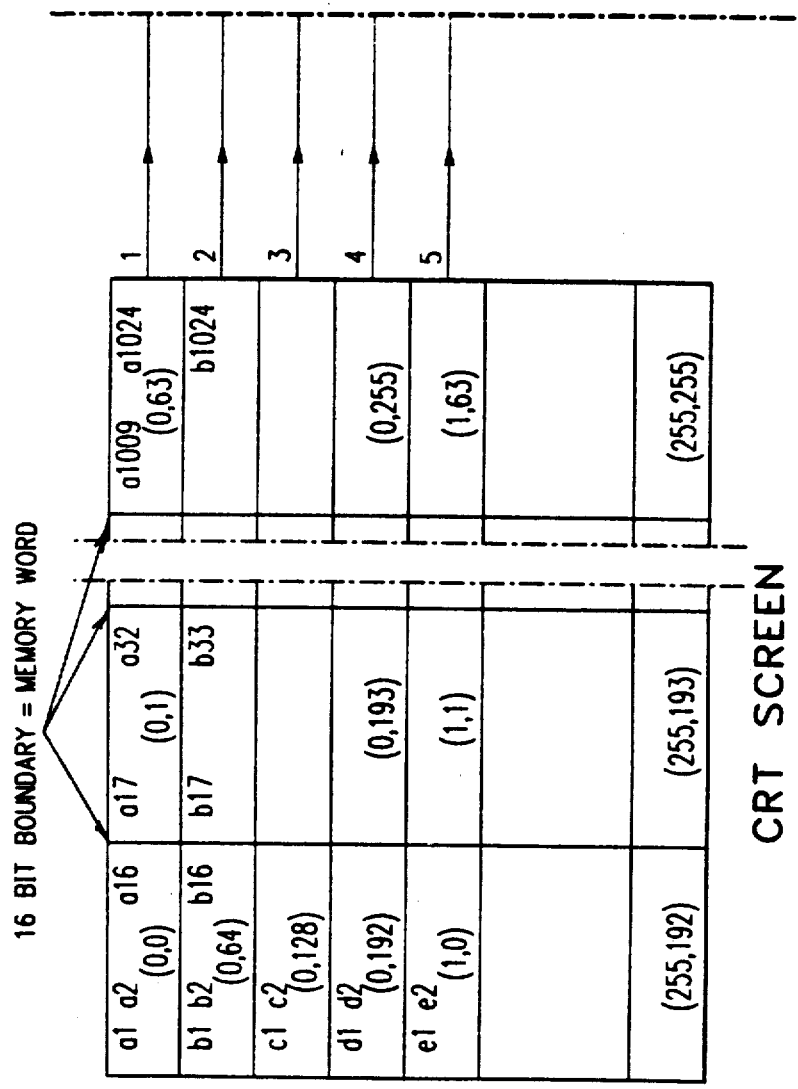
FIG. 1.1

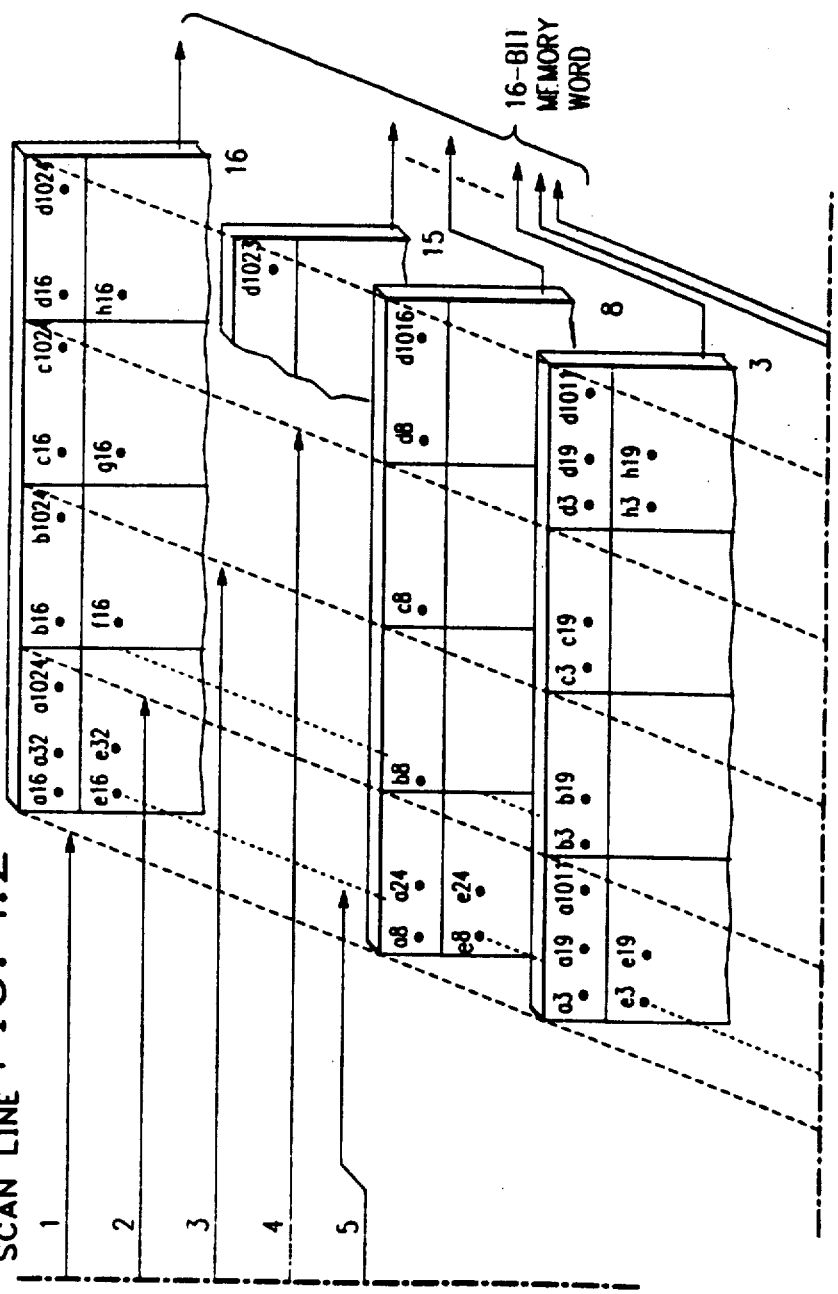
FIG. 1.2

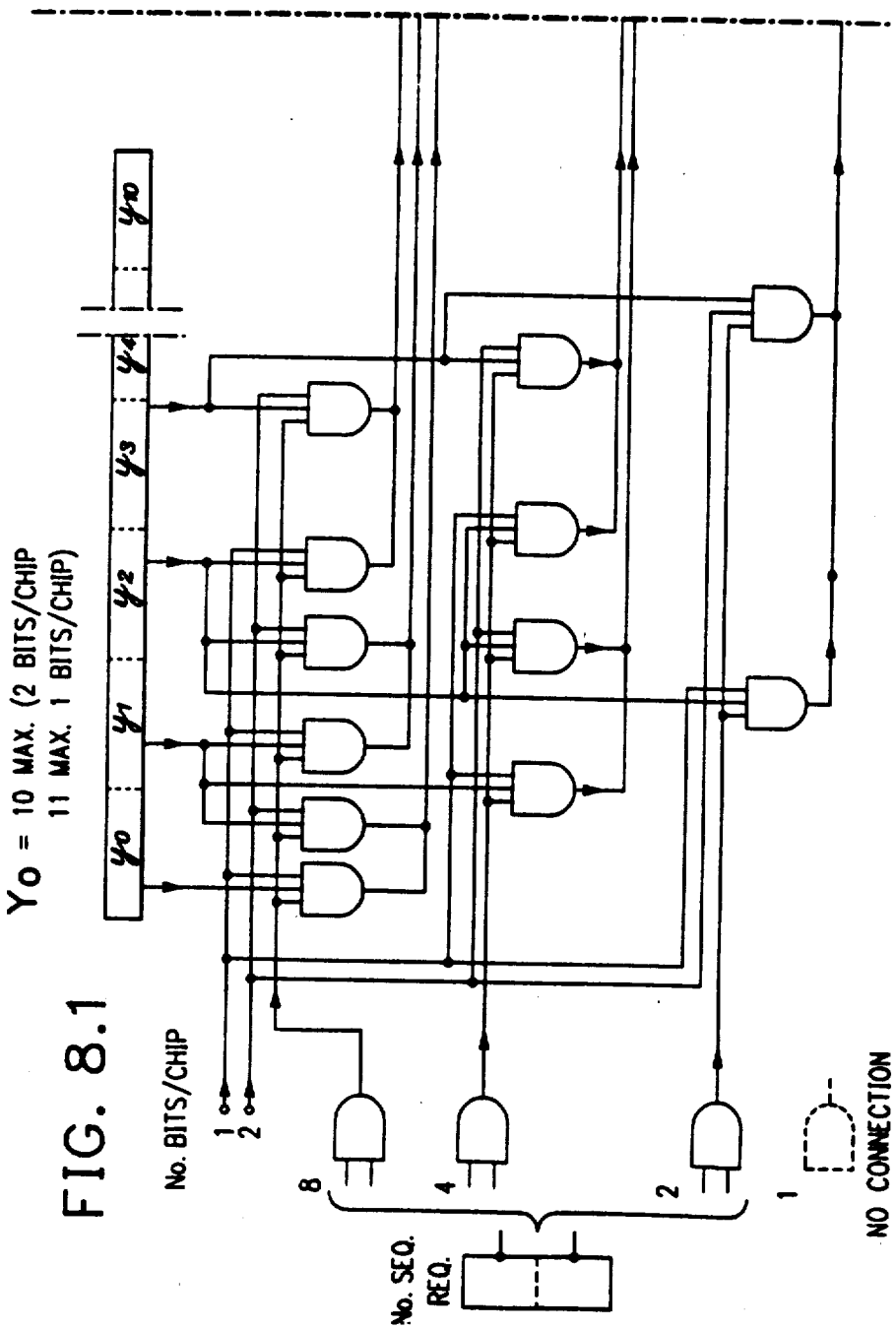
FIG. 8.1

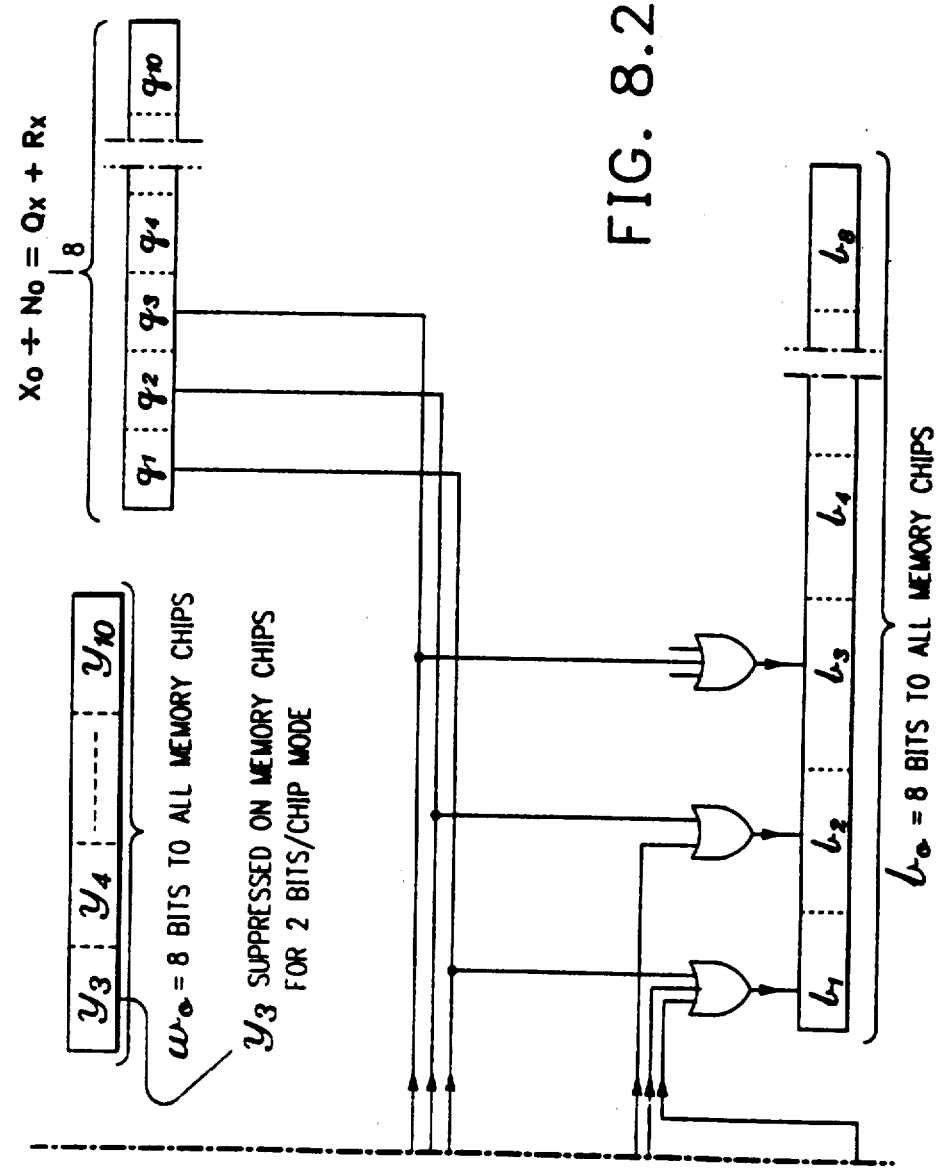
FIG. 8.2

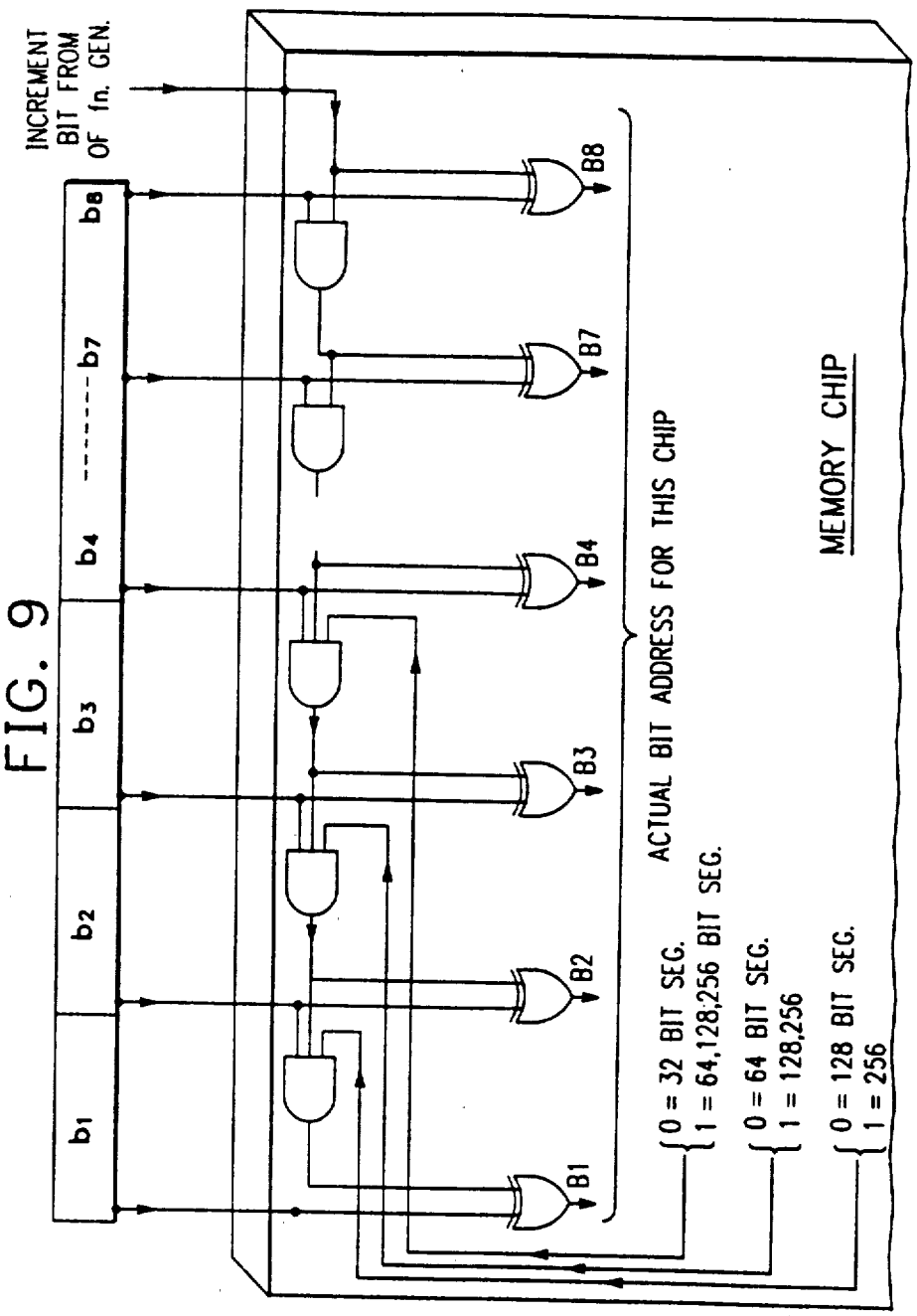

4 BITS/CHIP 64x2³ SCAN LINES

DISPLAY ARCHITECTURE HAVING VARIABLE DATA WIDTH

CROSS-REFERENCE TO RELATED APPLICATION

This invention is related to the invention disclosed in copending application entitled "Circuits for Accessing a Variable Width Data Bus With a Variable Width Data Field", Ser. No. 06/394,044 filed June 30, 1982, by F. H. Dill, D. T. Ling, R. E. Matick, and D. J. McBride and assigned to the assignee of this application. The subject matter of that application is incorporated herein by reference.

FIELD OF THE INVENTION

The present invention is generally directed to very large scale integrated (VSLI) circuit display architectures and, more particularly, to a dynamic memory chip and function generator to support bit buffered displays having a variety of screen formats and data path widths. The subject invention provides a memory chip having a variable, selectable number of bits per chip and a variable, selectable segment width. By segment, what is meant is that portion of a row (word) which maps to a single CRT scan line.

BACKGROUND OF THE INVENTION

There is a large segment of the data processing prior art directed to the transmission of data in fields or blocks, via parallel channels and busses, between processors, storage units, buffers, display terminals, input/output devices and the like. Some examples of typical prior art references in this environment include U.S. Pat. No. 4,126,897 entitled "Request Forwarding System" issued Nov. 21, 1978, to Capowski et al which describes a system wherein requests are forwarded from plural input/output channels to shared main storage. Variation in word widths are identified by tags such that "EOT" represents a "1-wide" request and a "QW" tag represents a "4-wide" request.

In U.S. Pat. No. 4,057,846 entitled "Bus Steering Structure for Low Cost Pipelined Processor Systems", issued Nov. 8, 1977, to Cockerill et al, a system is described including logic circuitry which provides a control function to steer data over the proper bus structures for interconnecting the processor, the memory and the input/output devices. No variable word problems are involved.

Likewise, Misunas et al in U.S. Pat. No. 4,174,536 discloses a system with a message routing switch wherein serial and parallel interfaces are associated with input/output ports. Davis et al in U.S. Pat. No. 4,075,691 and Larson et al in U.S. Pat. No. 4,079,452 show control systems using serial interface adapters and parallel interface adapters. Labeye-Voisin et al in U.S. Pat. No. 4,115,856 and Hostein in U.S. Pat. No. 4,034,346 show interfaces using parallel to serial conversion.

U.S. Pat. No. 4,159,534 to Gelson, Jr. et al, U.S. Pat. No. 4,070,710 to Sukonick et al, U.S. Pat. No. 4,004,283 to Bennett et al, U.S. Pat. No. 4,133,030 to Huettner et al, U.S. Pat. No. 4,205,373 to Shah et al, and U.S. Pat. No. 4,128,883 to Duke et al show systems using device, channel and interface adapters for coupling to a bus. In U.S. Pat. No. 3,949,375 to Ciarlo, a pair of 16-bit registers couple on an input/output bus to various display devices. In U.S. Pat. No. 3,500,466 to Carleton, a multiplexer is shown which couples different data sets through bit buffers to a common multi-line bus, and in U.S. Pat. No. 3,665,409 to Miller et al, a signal translator is shown for "skewing" or shifting data.

A particular application wherein it would be advantageous to interface between a variable width data bus and a variable width data field is in a bit-buffered display system of the type which provides high speed, high function text and graphics. The above-referenced application Ser. No. 06/394,044 filed by Dill et al discloses a general bit manipulator structure for parallel accessing a variable width data bus wherein, with a data bus of variable width $N_C$ and a data field of $N_f$, the structure can place the data field on the data bus with bit 1 of the data field aligned with a selected bit n within the data bus width. If the data field $N_f$ extends beyond the end of the data bus, the overflow bits of the data field are "wrapped around" and placed at the beginning of the data bus starting at postition 1 of the data bus. Also, special signals are generated and accompany these overflow or wrapped bits. Furthermore, select signals are generated to indicate which bits of the data bus contain valid data when the width of the data field is less than the width of the data bus.

The structure disclosed in the Dill et al application includes a modulo $N_C$ combinational ring shifter for aligning the data field with the data bus. An overflow signal generator is provided using a substraction circuit wherein the data field width is subtracted from the data bus width between alignment bit n and the end bit $N_C$. A negative subtraction result indicates overflow and the magnitude of the result specifies the bit positions from bit 1 of the data bus for the wrapped around bits. A select signal generator including two decoders is provided to indicate the valid data bit positions of the data bus.

The subject invention is an improvement which extends the basic concepts disclosed in the above-referenced application Ser. No. 06/394,044 by Dill et al. That architecture of "scan line on all chips" which employs only one bit per chip has a number of attractive features, particularly in the simplicity of the chips and the macro nature of the additional required functions. However, it is quite restrictive in the allowable screen formats and tradeoff with data path width. In addition, in this one bit per chip organization, no special features were provided to control wrapping at the right hand edge of the scan lines, i.e. between logical segment boundaries. This would have to be done separately, otherwise inconsistent and sometimes very undesirable wrapping effects would be obtained. For instance, for all segment boundaries which do not occur at the highest column address, any 16 bit data word which crosses such a segment boundary will automatically wrap to the next scan line if the bit column address is incremented in the usual fashion. This is highly undesirable. Furthermore, for the segment boundary occurring at the maximum value of column address, a 16 bit word which maps across this boundary will wrap to a scan line three scan line positions above the intended line. This can be visualized by referring to FIG. 1 which shows the mapping of sixteen 64K × 1 memory chips to the CRT screen. As can be seen in that figure, a column contains bits for four scan lines and incrementing the column address from maximum to zero selects the last then the first scan line, respectively, of that column. All of these effects are undesirable and are eliminated in the invention to be described. Furthermore, the restrictions on format versus data path width can be greatly reduced by adding a small amount of additional function to the chips. Of course, by adding more functions, all restrictions can be eventually eliminated, but the chip would be overly complex. The approach taken by this invention is to organize and operate the memory chips with either 32, 64, 128 or 256 bit wide segments (for the example of 64K chips), also externally selectable.

SUMMARY OF THE INVENTION

It is therefore a general object of the present invention to provide means for accessing in parallel a data bus of variable width and of aligning a data field, also of variable width, on the data bus in a manner that provides greater flexibility and generality than heretofore known.

A more specific object of the present invention is to provide a memory chip and function generator supporting a variable, selectable number of bits per chip and a variable, selectable segment width thereby accomodating many diverse applications.

The objects of the invention are accomplished by a new display architecture comprising a plurality of dynamic memory chips and a function generator. Each of the memory chips includes at least two data islands wherein each data island has its own data in/out line, chip select and increment bit supplied by the function generator. The function generator receives a starting address $X_o, Y_o$, the data path width $N_D$ and an encoded segment width S. A bit incrementer in the function generator generates increment bits $A_I$ based on the externally supplied modulo $N_D$. The function generator generates the physical word address $w_o$ and physical bit address $b_o$ based on the starting address $X_o, Y_o$, the data path width $N_D$ and the encoded segment width S. Logic circuitry is provided which is responsive to an overflow bit produced by the bit incrementer to control spill and wrap functions.

BRIEF DESCRIPTION OF THE DRAWINGS

The foregoing and other objects, aspects and advantages of the invention will be better understood from the following detailed description of the invention with reference to the accompanying drawings, in which:

FIG. 1 shows how FIGS. 1.1, 1.2, and 1.3 from a pictorial drawing illustrating a typical mapping of sixteen 64K×1 memory chips to a CRT screen;

FIGS. 8.1 and 8.2 from a block and schematic diagram of the segment address alignment circuits in the function generator allowing selectable segment width and one or two bits per chip;

FIG. 9 is a block and schematic diagram of the spill/wrap segment boundary control on the memory chips for selectable segment width of 32, 64, 128, or 256 bits per segment;

DETAILED DESCRIPTION OF THE INVENTION

Figure 2:
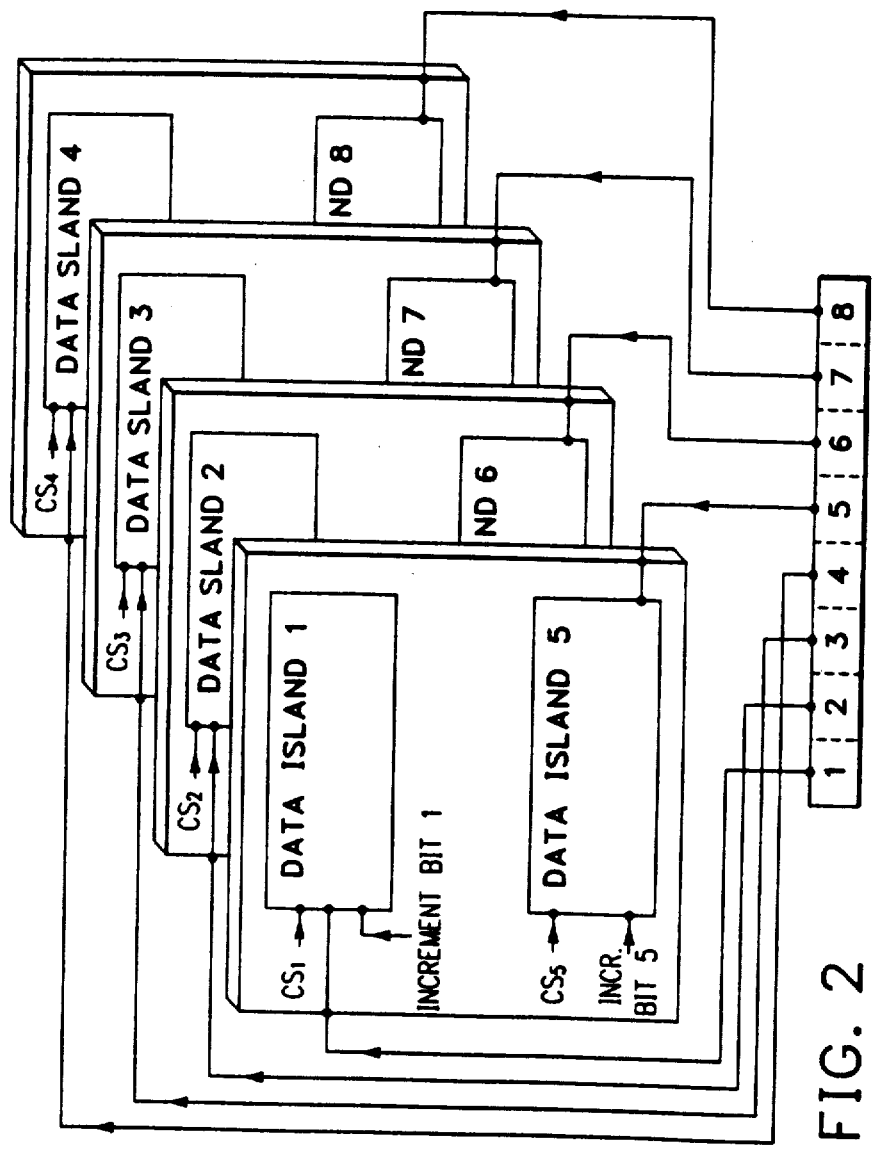
FIG. 2 is a schematic block diagram illustrating the data-in organization for the two bits per chip mode.

Conceptually and logically, a two bit per chip organization is identical to a one bit per chip organization but using twice as many chips, each of one-half the number of bits. This is illustrated in FIG. 2 for the data-in path of a four chip system using two bits per chip. Note that the data is now logically organized as two separate islands, each island having its own data in/out line, chip select, and increment bit supplied by the function generator. For a minimum sized system of four chips, there is provided a data path width of eight bits parallel write or read.

Figure 3:
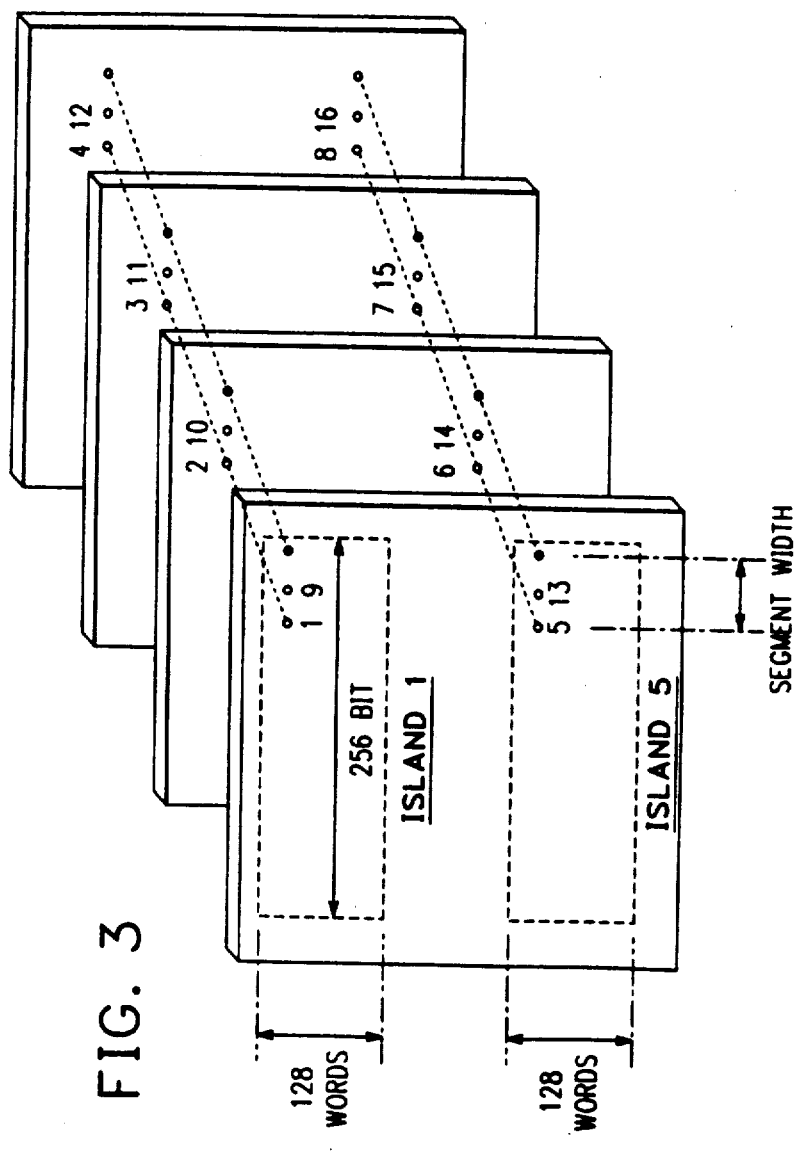
FIG. 3 is a schematic block diagram of stacked memory chips showing the composition of a scan line in the two bits per chip mode.

Each scan line on the CRT screen is now composed of an interlaced segment from each island as shown in FIG. 3. The first four bits come from the top island on each chip, while bits 5 through 8 come from the bottom island on each chip. If the segment width remained the same as in a one bit per chip organization, there would be twice as many pels per scan line and one-half as many scan lines. In other words, the screen would be twice as wide and one half the height.

Some choice in this format will be allowed in a later description by offering several different segment widths. For now, it will be assumed that the segment width is constant in order to simplify the consideration of what additional functions are required to make a given chip capable of either one or two bits per chip. First, each data island in FIG. 1 will require its own data signal, "chip" (now "island") select signal, and increment bit. All these signals are available in the function generator disclosed in application Ser. No. 06/394,044 of Dill et al. In a one bit per chip scheme, only four of each of these signals would be used in a minimum configuration (four chips). In a two bit per chip implementation, eight of each of these signals will be used. If an effective value of eight is used for $N_C$ (to be referred to as $N_D$ data path, since now "effective" number of chips becomes the number of data bits), then the data alignment, bit address incrementing, and chip select (now island select) are all automatically included. This is inherent in the manner in which the function generator and memory chip interact. However, there are two conditions that must be taken care of. The first is called "spill" which is the usual bit address incrementing where the data, say, starts on chip 3 and spills back to chips 1 and 2. A special case results when a spill occurs at the right hand edge of the screen. In this case, the data is allowed to wrap around on the same scan line to the left hand edge of the screen. This is referred to as "wrap around".

The occurrence of only spill is controlled by the overflow bit of the bit incrementer (carry propogate-adder) as disclosed in application Ser. No. 06/394,044 of Dill et al. In the present invention with a fixed segment width, since all the increment bits $A_I$ are generated in the function generator based on the externally supplied modulo $N_C$ or $N_D$, both spill and wrap-around will automatically be provided in either a one or two bits per chip scheme with no additional functions.

In order to get a wrap-around, two conditions must exist simultaneously. First, the segment address bits must all be 1's and second, there must be an increment bit for this island generated by the function generator due to a spill. The latter appears as a negative value for $A_I$ with increment bits placed in the correct position as determined by the value of $N_C$ or $N_D$ used in the following equation:

$$A_I = N_C - (X_o + N_f)$$

where $N_f$ is the font length, which may be a data field of variable width. For a one bit per chip scheme, $N_C$ will be 4 and only four increment-bit signals are generated. For a two bit per chip scheme, the effective value of $N_C$, now called $N_D$, will be 8 with eight increment-bit signals. Because of the manner in which $A_I$ signals are generated, the two necessary conditions required for wrap around are automatically provided at the correct time and place for either two or one bit per chip organizations. No special or additional features are required except to ensure the correct value of effective $N_C$ in calculating $A_I$. A minor addition is needed for controlling spill/wrap when the segment width is allowed to vary, as will be described later. In addition to the spill/wrap control, the chip select is also automatically provided in either a one or two bit per chip scheme as specified externally by the effective value of $N_C$.

Figure 4:
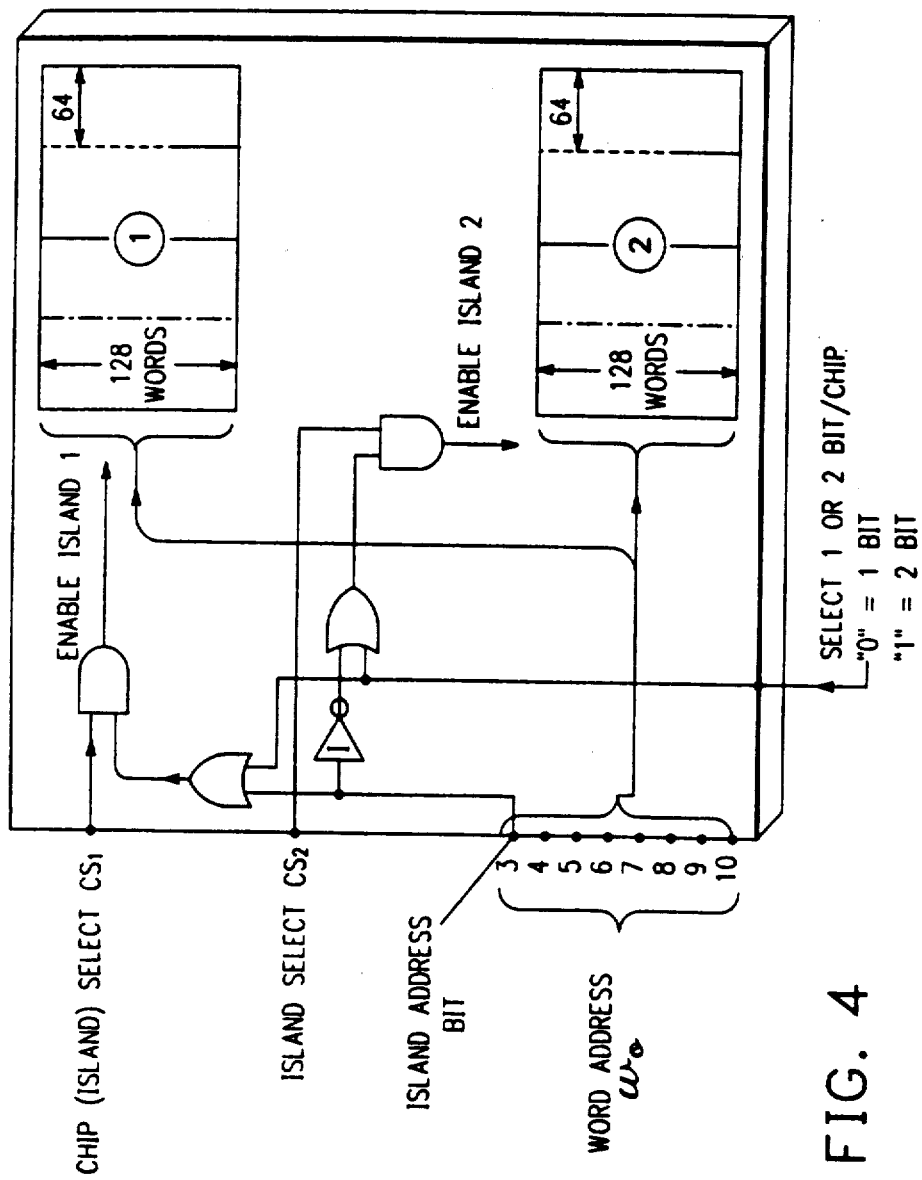
FIG. 4 is a block and schematic diagram of a single memory chip showing additional functions required for word selection, allowing for either one or two bits per chip.

One small detail not automatically provided is the correct word addressing for the choice of one or two bits per chip. Since the memory chips have no inherent way of knowing which scheme is to be used, some additional information obviously must be provided. It is assumed that one additional signal line is connected to each chip to specify one or two bits per chip. This signal is used to control the word line selection on the two islands of each chip as shown in FIG. 4. A 0 on this line insures that a word from only one of the islands, as determined by the high-order word address bit (number 3 in FIG. 4), is selected for one bit per chip. A 1 on this line essentially makes this high order word address bit (number 3) always look like a 1, thus selecting one word from each island in a two bits per chip organization.

In the architecture disclosed in application Ser. No. 06/394,044 of Dill et al using one bit per chip, the number of scan lines was fixed by the number of logical words per chip. The different wrap conditions which occur on different segment boundaries must be provided externally by the function generator. If the function generator is designed for a 64 bit segment width, then there could only be 256 words by 4 scan lines per word or 1,024 scan lines for any sized system. Under these conditions, varying the number of chips only changes the number of pels per scan line and not the number of scan lines unless the function generator is redesigned. This can be easily rectified by allowing each physical word line on a chip to have a variable number of segments from 1 to 8, externally selectable.

In order to simplify the circuits, the segment width is limited to a $2^n$ boundary, allowing 1, 2, 4 or 8 segments per word line.

Figure 5:
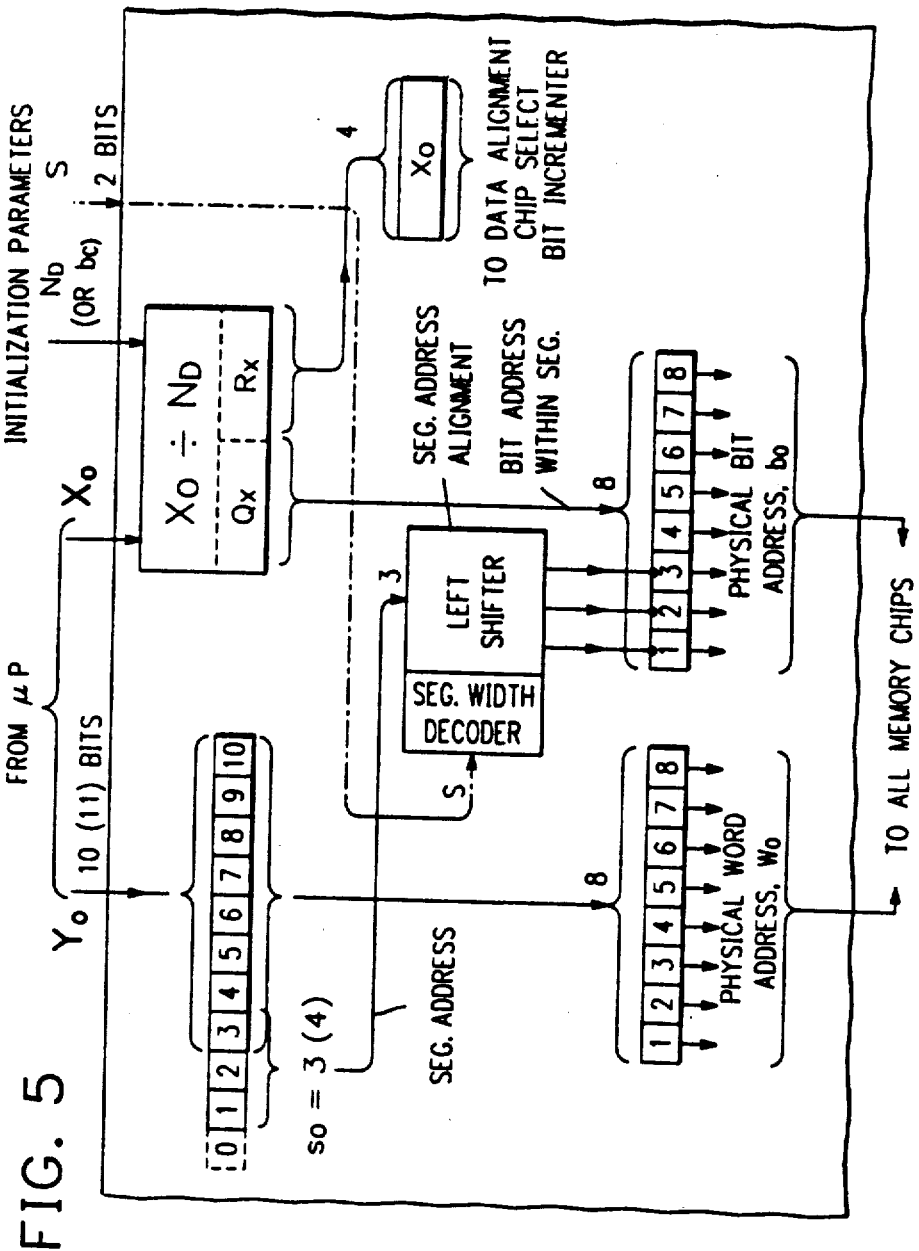
FIG. 5 is a schematic diagram of the memory address generation within the function generator.

The correct bit address for a variable segment, variable bits per chip architecture will be generated in the function generator. The memory chips only have provision to select two or one bits per chip and spill/wrap control circuitry. In order to see how the variable number of segments is obtained, closely consider the overall addressing scheme. It is assumed that the system microprocessor will supply the function generator with a character starting address $X_o, Y_o$ which represent the screen pel indices on a two dimensional matrix. It is further assumed that these values have been tested to insure they do not exceed the limits of the system configuration, i.e. they are valid. The manner in which the memory chips are mapped to the screen allows the $Y_o$ address to be used directly for part of the address. This results from the fact that both the physical and logical scan lines lie on boundaries of $2^n$, i.e. there are either 256 or 128 times 8, 4, 2 or 1 scan lines possible. However, since there can be any value of $N_C$ or $N_D$ from 4 to 16, the $X_o$ address must first be divided by $N_D$ to obtain the necessary components from which the bit address can be formed. The manner in which the final address is formed is shown in FIG. 5. The eight lower order bits of $Y_o$ are used directly as the physical word address $w_o$. As was previously discussed in conjuction with FIG. 4, the highest order bit of this group of 8 (i.e. bit number 3 of $Y_o$ in FIG. 5) will be the island address bit. It will be valid for a one bit per chip scheme and overriden by the "select one or two bit per chip" signal for a two bit per chip scheme as shown in FIG. 4.

Figure 6:
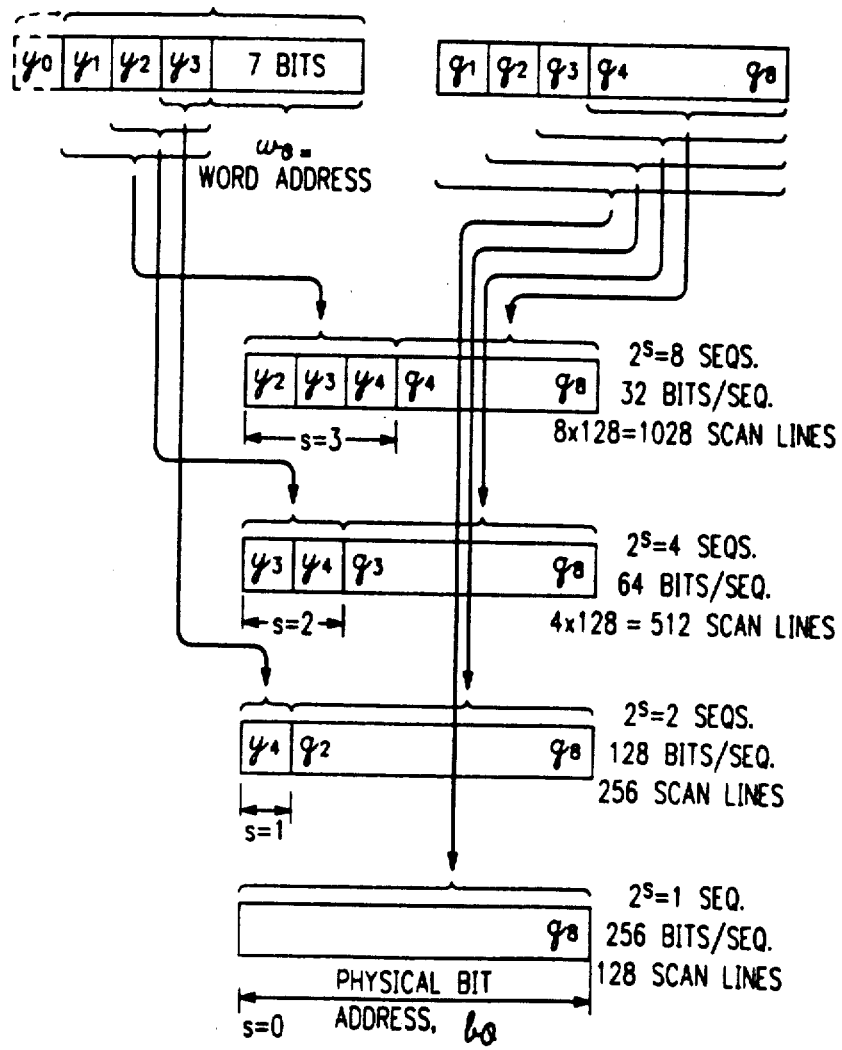
FIG. 6 is a functional block diagram illustrating the components of word and bit address for variable segment width, using two bits per chip mode.
Figure 7:
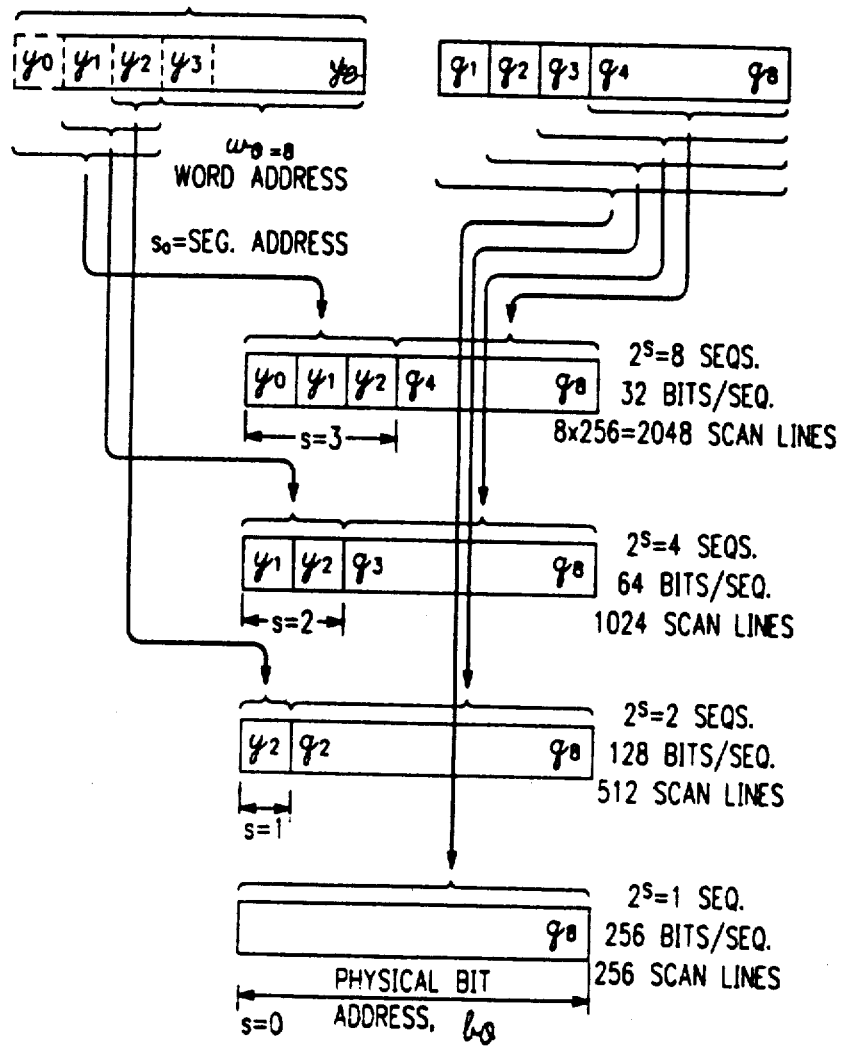
FIG. 7 is a functional block diagram illustrating the components of word and bit address for variable segment width, using one bit per chip mode.

The physical bit address is obtained as $Q_x$ for the bit address within a segment and $s_o$ as the segment of a physical word line. $Q_x$ is the integer part of $X_o/N_D$ with the remainder $R_x$ being used for data-alignment, chip select and bit incrementer. The combination of $s_o$ and $Q_x$ must be aligned in the proper way for segment addressing, depending on the number of segments per word and bits per chip. If there is only one segment per word, all 8 bits of $Q_x$ are valid and none of $s_o$ are used. For two segments per word, only the lower order seven bits of $Q_x$ will be valid and the eighth bit, for the high order position, comes from $s_o$. However, the actual bit chosen from $s_o$ depends on whether the chip is operating in the one or two bits per chip mode. In the mode using two bits per chip, only the seven lower order bits of $Y_o$ are used for the word address $w_o$. The three higher order bits $y_1, y_2, y_3$ are used for $s_o$, the higher order part of the segment address $b_o$ as shown in FIG. 6. As the number of segments per word increases, the number of bits per segment obviously decreases. This requires fewer address bits from $Q_x$ to address a bit within a segment and more bits, $s_o$, from $Y_o$ to select the segment. The manner in which the $s_o$ bits are catenated to the $Q_x$ bits to form $w_o$ and $b_o$ is shown in FIGS. 6 and 7 for a two bits per chip and a one bit per chip scheme, respectively. Note that for a fixed number of bits per chip, the number of physical words is fixed at either 128 or 256 for the two or one bit per chip mode, respectively, with $w_o$ being either 7 or 8 bits, respectively. Hence, the lower order segment address bits start either at position $y_3$ as in FIG. 6 or at $y_2$ as in FIG. 7 for the two cases. Since these two bit positions will always be the lowest order segment address bit, they must be catenated to the highest order bit of $Q_x$ used for selecting the bit within the segment. However, the latter boundary moves as the number of segments changes so the segment address must be properly placed with respect to this "selectable" boundary and is different for the two and one bits per chip modes as shown in FIGS. 6 and 7.

The segment address alignment circuitry required within the function generator for properly forming $b_o$, given as input the encoded value S for the number of segments per word and a signal indicating one or two bits per chip, is really quite small as shown in FIG. 8. The alignment for 8, 4, 2 and 1 segments per word requires 6, 4, 2 and 0 AND gates at the most. The three OR gates may be needed on the $b_o$ register for fan-in. The total circuit count, including the 2-bit register at 10 gates per bit would be less than 50 gates.

The spill/wrap functions are controlled by the overflow or carry bits between segment boundaries, the overflow being generated by the carry propagate circuit disclosed in application Ser. No. 06/394,044 of Dill et al. This overflow bit must be enabled and inhibited at the proper boundaries for spill and wrap, respectively. Spill is just the usual overflow of an address to the next higher order bit position, as long as the bit is still within the segment. Wrap occurs at the segment edge, i.e. the bit address is at the largest value within the segment and one bit increment should not overflow into an adjacent segment but rather only reset the address within the segment to zero. Since this segment edge is variable, the overflow bit of the carry propagate circuit on the memory chip must be controlled. The segment edge boundaries are specified by bits $b_1$, $b_2$ and $b_3$ and represent the points of control. This control can be very easily achieved by only minor modifications to the original carry propagate circuit used for bit-incrementor. It is only necessary to add one additional input to each of the three AND gates which control the carry propagate signal between the three high order bits of $b_o$, namely $b_1$, $b_2$ and $b_3$ as shown in FIG. 9. The additional inputs will be external control signals from the function generator (or elsewhere) which specify the segment width as indicated. A 1 on any control line allows an overflow of the address increment to occur and hence permits spill. A 0 on any position inhibits spill but automatically provides the "wrap" function as follows. A wrap is attempted only when the bit address $b_o$ from the function generator is all 1's for the length of bits needed for the given segment width, e.g. bits 3 through 8 for a 64 bit segment. An "increment" bit from the function generator to any given chip will reset all these address bits to 0 for that chip via the on-chip bit increment circuitry, and the carry propagation will be suppressed at the boundary between bits $b_2$ and $b_3$ in this case, i.e. no overflow. Hence, the bit address will be 0 for bits $b_3$ to $b_8$ but the selection of the segment, as specified by the value of $b_1$ and $b_2$ will be as provided by the function generator, as desired. Hence, the address wraps to the first bit of that same segment, but only on that chip. Any chip which does not receive an increment-bit signal will use the full bit address as provided by the function generator. The segment width control signals could be direct signals. The function generator requires roughly an additional 50 gates. The memory chips require no additional gates but three additional control signals and pins. The latter could be reduced to two by the use of an encoded signal with three on-chip decoder AND gates. The selectable two or one bits per chip organization requires three additional pins (one additional chip select, bit increment and one control pin) plus a few on-chip island select/control circuits. The major impact of this function is on the memory array layout into islands which has not been considered. All the above have neglected the additional circuits needed for the variable control to provide proper CRT refresh and the memory refresh functions.

Figure 10A:
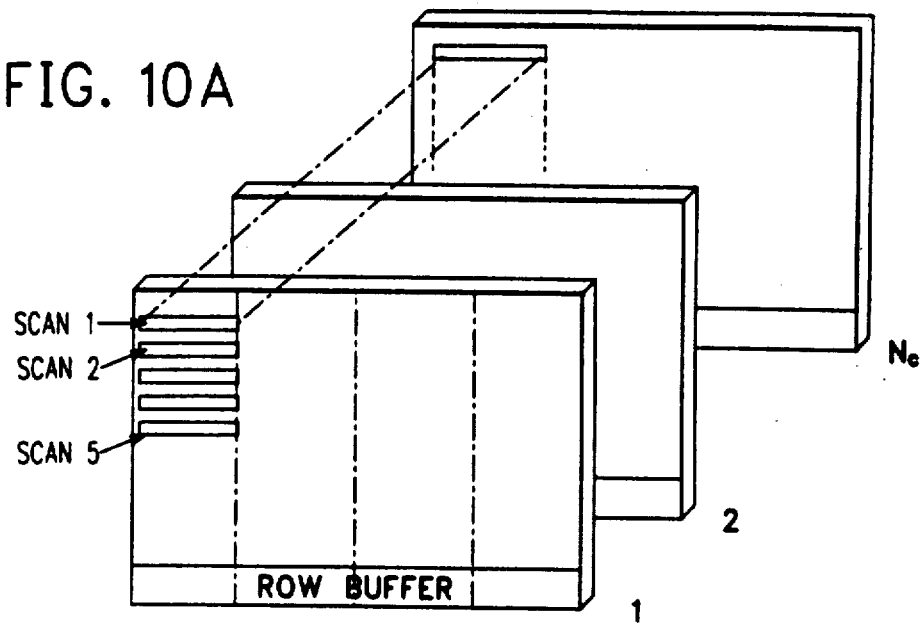
FIGS. 10A and 10B are schematic block diagram illustrating, respectively, mapping sequential scan lines in the same column and mapping sequential scan lines in the same row.

The formation of the physical word (row) address $w_o$ as done in FIGS. 4 through 8 result in a mapping of scan lines to the memory chip rows and columns as shown in FIG. 10A. Sequential Y scan lines are located within a given segment and require successive row (word) addresses. Since a row buffer will normally be loaded with all segments in one row as shown, then refreshing successive scan lines on the CRT will require reloading of the row buffer. If there are, for instance, four segments per row, then only one fourth of the row buffer is used to refresh the CRT on each reload. This mapping has certain advantages and disadvantages. A major advantage occurs whenever there are enough segments so that refreshing the CRT will automatically refresh the dynamic memory cells at the required time interval. For instance, if the dynamic cell refresh rate is once every two milliseconds, then using a 60 Hz (16.6 ms) refreshed CRT, eight segments per row mapped as in FIG. 10A will cause the entire memory to be refreshed (accessed) every $16.6/8 \approx 2$ ms. Thus, there is no need for separate cell refresh logic. An organization using four segments per row will refresh the memory in 16.6/4 or approximately every 4 ms, etc. Therefore, for certain organizations, automatic memory refresh comes for free. Unfortunately, as the number of segments per row decreases, the memory refresh time increases beyond that tolerable. If the automatic refresh is not possible for a given organization, then the mapping of FIG. 10A is wasteful of the primary port availability since each load of the row buffer is not fully utilized. This can be rectified by using the scan line to memory mapping of FIG. 10B where sequential scan lines are located sequentially along a given word (row). Each load of the row buffer will make use of all the bits for CRT refresh before a row buffer reload is necessary. Hence, the primary port will be available a larger percentage of the time as compared to the mapping of FIG. 10A. Note the two mappings become equivalent for the case of one segment (one scan line) per row.

Figure 10B:
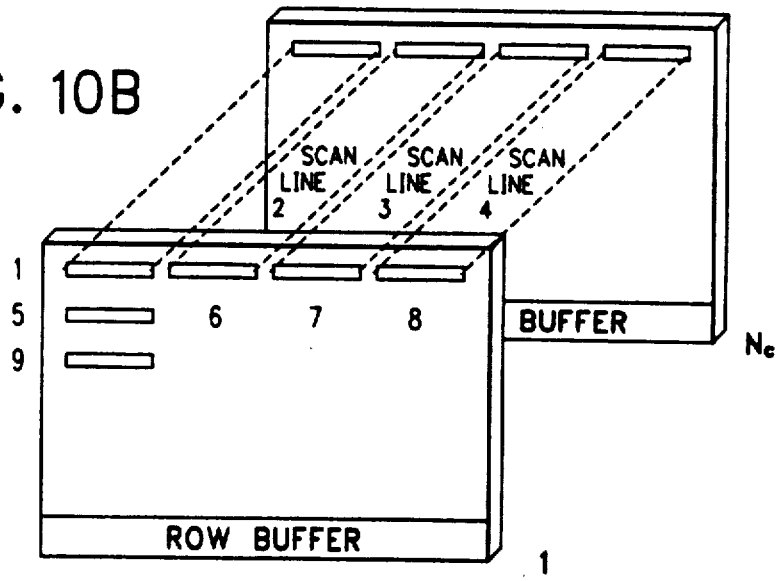
Figure 11:
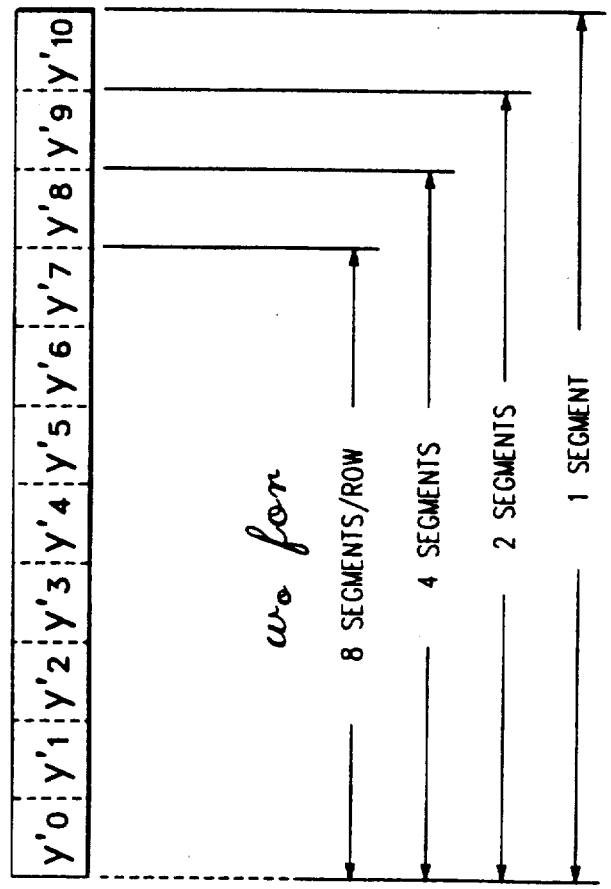
FIG. 11 is a diagram showing the $w_o$ word (row) address formation for scan lines stored sequentially along a row as shown in FIG. 9B.

The memory chips of FIG. 4, including the features of FIG. 9, are themselves insensitive to these mappings and will support either. The mapping of FIG. 10B is obtained with minor changes in the formation of the external addresses supplied to the chips. The physical word (row) address derived in FIG. 5 for the mapping of FIG. 10A will require the bits shown in FIG. 11 to obtain the mapping of FIG. 10B. The formation of the bit (column) address shown in FIGS. 5 through 8 remains much the same except bits $y_1$, $y_2$, $y_3$ used previously must now be replaced by bits $y_8$, $y_9$, $y_{10}$, respectively. Bit $y_0$ still remains $y_0$ in FIG. 7 (high order bit position). Thus, with one memory chip design, the user is provided with a very large design space from which to optimize the total system performance.

Figure 12:
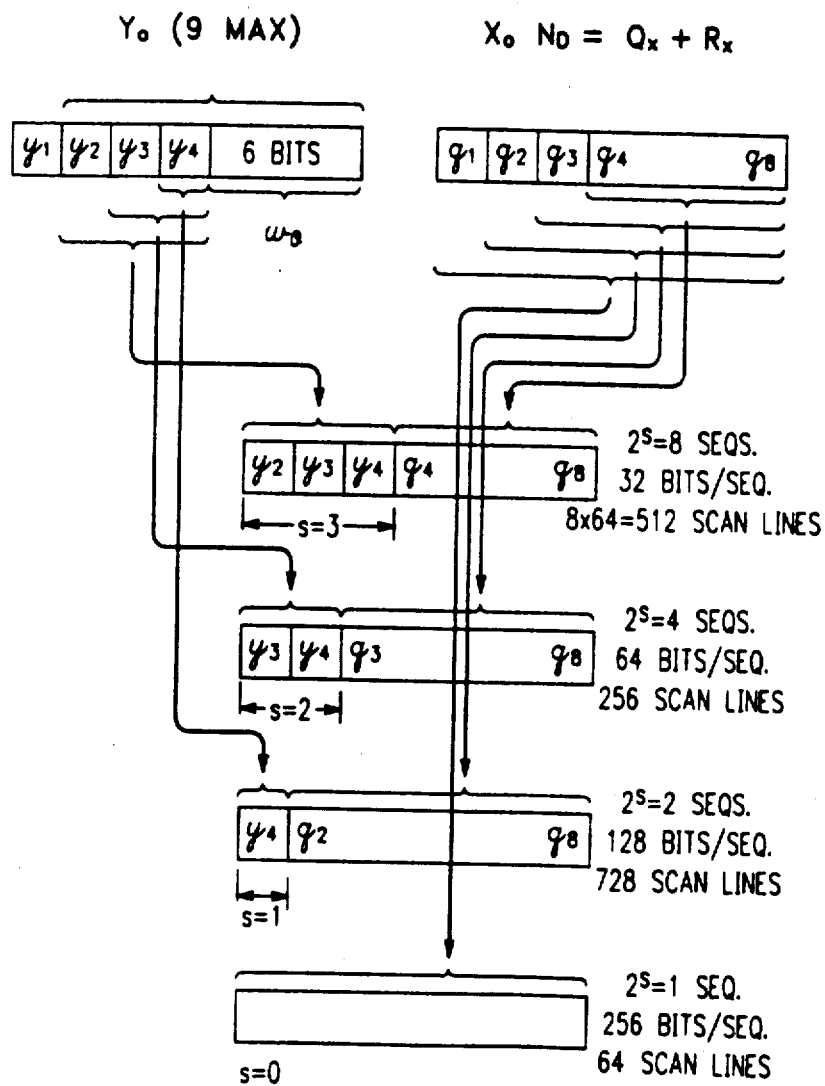
FIG. 12 is a functional block diagram showing the components of word and bit address for variable segment width, using the four bits per chip mode.

The memory chip can provide a wider and more desirable range of screen formats by allowing four bits per chip in addition to one and two bits per chip as described above. Such an architecture requires four islands on a chip and is logically equivalent to having two of the above chips mounted on the same chip with, of course, the appropriate reduction in bits per island if the chip is still 64 K. If chip densities increase to 128 K bits per chip as expected, then the four bits per chip will be an exact case of two bits per chip with two old chips per one new chip. The addressing and island select, etc. will be a straightforward extension of the two or one bit per chip architecture. However, if the variable segment width selection is also provided, some additional alignment will be necessary to obtain the correct bit address $b_o$. Assuming a 64K bit chip as previously, the components which make up the word $w_o$ and bit address for each chip are as shown in FIG. 12. Since there are now fewer words per island, i.e. 64, the word address is only six bits and the bits $y_2$ through $y_4$ must be used as part of the segment address (higher order parts of $b_o$) as shown. The segment address alignment circuitry of FIG. 8 would require the addition of the following circuits to allow four bits per chip:

| | |
|---|---|
| 8 segment selector | 3 AND gates |
| 4 segment selector | 2 AND gates |
| 2 segment selector | 1 AND gate |
| Total | 6 AND gates |

In addition, all the AND gates for the entire segment address alignment would now be four input rather than three input gates. Some additional OR gates may be needed for fan-in and an additional signal line (or decoder) to specify the four bits per chip mode. In any case, the additional circuitry for the segment address alignment to allow four bits per chip is on the order of 10 gates and the entrire alignment net is still less than 100 gates, a very small amount for the added versatility.

The variable segment width and variable number of bits per chip allow a wide range of screen formats. The maximum number of pels per line $X_{max}$ and maximum number of scan lines $X_{max}$ for any given architecture and number of chips can be determined as follows:

| |
|---|
| $X_{max}$ = (no. bits/chip)(no. chips)(no. bits/segment) |
| = $N_D$(no. bits/segment) |
| $Y_{max}$ = (256/no. bits/chip)(no. segments/word) | where $N_D$ is the maximum data path width for writing into the memory. If $N_D$ is held constant for two cases of special interest, namely 8 and 16 bit data widths, then the possible screen formats for one, two and four bits per chip architecture are as given in Table I for the various allowed segment widths. This table assumes all bits are used as well as only one "stack of memory chips".

TABLE I

| | Screen Format Options for 8 and 16 bit, Fixed Data Path Width | | | |
|---|---|---|---|---|
| Number of Segments | Chip | Screen Format for Data Path of | | |
| or bits/seg. | Data Width | 8 bits (X,Y) | 16 bits (X,Y) | |
| 1 (256) | 1 bit/chip | 8 chips   ⎧  2048 × 256 | 4096 × 256  ⎫   16 chips |
| 2 (128) | 1 bit/chip |   ⎨  1024 × 512 | 2048 × 512  ⎬ |
| 4 (64) | 1 bit/chip |   ⎩  512 × 1024 | 1024 × 1024 ⎭ |
| 2 (128) | 2 bits/chip | 4 chips  ⎧  1024 × 256 | 2048 × 256 ⎫  8 chips |
| 4 (64) | 2 bits/chip |   ⎨  512 × 512 | 1024 × 512 ⎬ |
| 8 (32) | 2 bits/chip |   ⎩  256 × 1024 | 512 × 1024 ⎭ |
| 2 (128) | 4 bits/chip | 2 chips  ⎧  1024 × 128 | 2048 × 128 ⎫  4 chips |
| 4 (64) | 4 bits/chip |   ⎨  512 × 256 | 1024 × 256 ⎬ |
| 8 (32) | 4 bits/chip |   ⎩  256 × 512 | 512 × 512 ⎭ |

Screen formats in between those listed can be obtained by selecting the nearest larger size and only using the required number of bits. For instance, a screen size of 768 by 1024 can be obtained by using 16 chips in a one bit per chip, 4 segments per word, 16 bit data path architecture. This would give a maximum screen of 1024 by 1024 so the 768 by 1024 format has 25% of the bit buffer unused. The amount of unused bits can be reduced to 0 by using exactly 12 chips arranged in three stacks of 4 chips per stack, using two bits per chip, 8 segments per chip and hence a screen of (3×256) by 1024. The data-in path is now only 8 bits but adequate for most cases. The only drawback associated with using separate stacks for one screen format is the additional control required for both addressing data-in and for CRT refresh. Some of this control will already be available in a multi-screen system.

Figure 13:
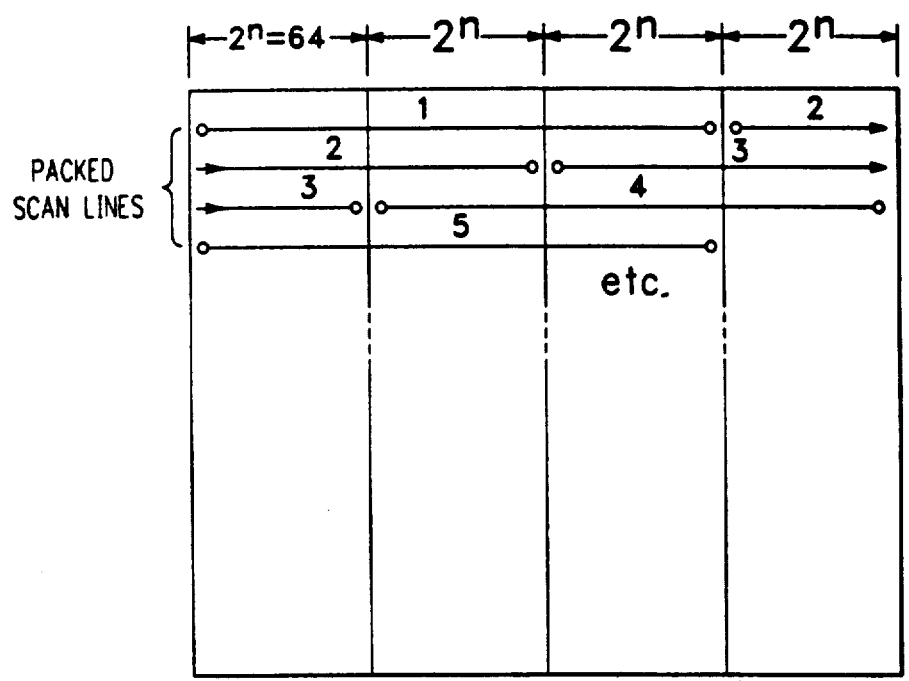
FIG. 13 is a diagramatic illustration of the packed scan line scheme with boundaries on a multiple of $2^n$.

Brief consideration was give to a "packed" scan line scheme in which any subsequent scan line starts physically where the previous line stopped as shown in FIG. 13. It is assumed that the scan line boundary will be an integer multiple of $2^n$. The case is shown for $n=6$ and a scan line being $3 \times 2^6$. A serious disadvantage of this scheme is that the physical address for two characters in similar positions of two scan lines can be quite different and requires excessive computation to obtain $b_o$ and $w_o$. In fact, the value of $b_o$ will depend on the value calculted for $w_o$ so several sequential operations are necessary. The one, two and four bits per chip organization with variable segment width has a distinct advantage over the "packed" scan line scheme in that only one computation $X_o/N_D$ is required for the address. The portion of $Y_o$ used for the $b_o$ address is predefined, requiring no computation. The path is "opened" once and essentially stays open at the same predetermined locations for all addresses. Thus, while the addressing of a one, two and four bits per chip scheme is a little more difficult than the fixed data width scheme using a direct buffer to screen mapping, it is considerably much simpler than the "packed" scan line mapping.

What is claimed is:

1. A display architecture of memory chips for supplying scan line data to a display screen, said display architecture allowing a variable, selectable number of bits per chip and a variable, selectable segment width defining a full scan line on said display screen, comprising:

a plurality of dynamic memory chips, each of said chips including at least first and second data islands, each island having its own data in/out line, chip select line, and increment bit line, said chips being arranged from a lowest order chip to a highest order chip and addressable by a physical bit address $b_o$ and a physical word address $w_o$;

processor means for generating a starting row and column address $X_o, Y_o$ of data to be supplied to said display screen, a segment width S, and a data path width $N_D$ equal to a maximum number of pels per line divided by the number of bits per segment; and function generator means for supplying signals to the data in/out lines, chip select lines, and increment bit lines of said dynamic memory chips, said function generator means being connected to said processor means to derive the word address $w_o$ and an island address bit from the starting column address $Y_o$ and to generate the bit address $b_o$ as the integer portion of the quotient of the starting row address $X_o$ divided by $N_D$, the highest order bits of said bit address $b_o$ being determined by the segment width S and a segment of a physical word line $s_o$ derived from the highest order bits of the starting column address $Y_o$, said function generator means including bit incrementing means for computing the bit increment $A_I = N_D - (X_o + N_f)$, where $N_f$ is a data field of variable width, and bit incrementer and carry propagate means on each of said chips for modifying the physical bit address $b_o$ to an actual bit address for that particular chip, said function generator means further including spill/wrap control means connected to said bit incrementer and carry propagate means for, controlling the carry propagation of the high order bits of the actual bit address to cause the bit address to wrap to the first bit of the same segment, but only on that chip, when the sign of $A_I$ is negative and the address bits for that segment are all 1's.

2. The display architecture according to claim 1 wherein the data path $N_D$ width is fixed, further comprising means for selecting the segment widths thereby efficiently using said dynamic memory chips to provide a variety of screen formats.

3. The display architecture according to claim 1, wherein the screen format of the display is fixed, further comprising means for selecting the segment widths thereby efficiently using said dynamic memory chips to support a variety of data path width $N_D$.

4. The display architecture according to claim 1 wherein said processor means comprises means to provide control of wrap and bits per chip to allow dynamic or static control of screen formats, data path width $N_D$ and wrap at a display screen edge.

5. The display architecture according to claim 1 wherein each of said dynamic memory chips includes n data islands and further comprising means for selecting 1 to n bits per chip.

6. The display architecture according to claim 1 wherein each of said dynamic memory chips includes row buffers for each data island and data for sequential scan lines for the display are stored in the same column of said plurality of dynamic memory chips, each column being $\frac{1}{2}^n$ part of a row, further including means for transferring data from an addressed row to said row buffer of each said data island to supply said data for refreshing said display.

7. The display architecture according to claim 7 wherein said means for transferring operates at a required refresh rate of said dynamic memory chips thereby eliminating the need for separate refresh logic for said dynamic memory chips.

8. The display architecture according to claim 1 wherein each of said chips includes row buffers for each data island and data for sequential scan lines for the display are stored in the same row of said plurality of dynamic memory chips, each row storing data for $2^n$ scan lines, further including means for transferring data from an addressed row to said row buffer of each said data island to supply said data for refreshing said display.

9. The display architecture according to claim 8 further including refresh logic for said dynamic memory chips and wherein said means for transferring operates synchronously with said refresh logic thereby minimizing the number of refresh cycles required from said refresh logic.

* * * * *